United States Patent
Chen et al.

(10) Patent No.: US 7,606,489 B2
(45) Date of Patent: Oct. 20, 2009

(54) SYSTEM CONTROL AND MANAGEMENT OF PASSIVE OPTICAL NETWORKS

(75) Inventors: Charles Chen, Santa Rosa, CA (US); Yibin Yang, Santa Rosa, CA (US)

(73) Assignee: Cortina Systes, Inc., Sunnyvale, CA (US)

(*) Notice: Subject to any disclaimer, the term of this patent is extended or adjusted under 35 U.S.C. 154(b) by 687 days.

(21) Appl. No.: 11/420,467

(22) Filed: May 25, 2006

(65) Prior Publication Data

US 2009/0142059 A1     Jun. 4, 2009

(51) Int. Cl.
 *H04J 14/00* (2006.01)
(52) U.S. Cl. .............................. 398/58; 398/67; 398/68; 398/72
(58) Field of Classification Search ................. 398/9, 398/17, 22, 25, 31, 33, 66–68, 70–72, 106, 398/107, 151, 158, 165, 166, 74, 58
See application file for complete search history.

(56) References Cited

U.S. PATENT DOCUMENTS

| | | | |
|---|---|---|---|
| 7,386,234 B2* | 6/2008 | Lee et al. | 398/67 |
| 7,493,043 B2* | 2/2009 | Saito et al. | 398/71 |
| 2007/0274717 A1* | 11/2007 | Xu et al. | 398/58 |
| 2008/0285972 A1* | 11/2008 | Takeuchi et al. | 398/60 |

\* cited by examiner

*Primary Examiner*—Dalzid Singh

(57) ABSTRACT

A highly reliable, carrier class passive optical network and associated devices which employs multiple instances of operating software in host systems, as well as mechanisms to automatically determine whether an individual OLT device has entered or left the system without disruption to overall system operation.

19 Claims, 8 Drawing Sheets

SYSTEM CONTROL AND MANAGEMENT OF PASSIVE OPTICAL NETWORKS

FIELD OF THE INVENTION

This invention relates generally to the field of packet-switched networks. More particularly, it relates to method(s) and system(s) for system control and management a Passive Optical Network (PON) and likewise to any point-to-multipoint access network.

BACKGROUND OF THE INVENTION

The communications industry is on the cusp of a revolution characterized by three driving forces that will forever change the communications landscape. First, deregulation has opened the local loop to competition, launching a whole new class of carriers that are spending billions to build out their networks and develop innovative new services. Second, the rapid decline in the cost of fiber optics and Ethernet equipment has made them an attractive option for access loop deployment. Third, the Internet has precipitated robust demand for broadband services, leading to an explosive growth in Internet Protocol (IP) data traffic while, at the same time, putting enormous pressure on carriers to upgrade their existing networks.

These drivers are, in turn, promoting several key market trends. In particular, the deployment of fiber optics is extending from the telecommunications backbone to Wide-Area Network(s) (WAN) and Metropolitan-Area Network(s) (MAN) and the local-loop. Concurrently, Ethernet is expanding its pervasiveness from Local-Area Network(s) to the MAN and the WAN as an uncontested standard.

The confluence of these factors is leading to a fundamental paradigm shift in the communications industry, a shift that will ultimately lead to widespread adoption of a new optical IP Ethernet architecture that combines the best of fiber optic and Ethernet technologies. This architecture is poised to become the dominant means of delivering bundled data, video, and voice services on a single platform.

Passive Optical Networks (PONs) address the "last mile" of communications infrastructure between a Service Provider's Central Office (CO), Head End (HE), or Point of Presence (POP) and business or residential customer locations. Also known as the "access network" or "local loop", this last mile consists predominantly—in residential areas—of copper telephone wires or coaxial cable television (CATV) cables. In metropolitan areas—where there is a high concentration of business customers—the access network often includes high-capacity synchronous optical network (SONET) rings, optical T3 lines, and copper-based T1 lines.

Historically, only large enterprises can afford to pay the substantial costs associated with leasing T3 (45 Mbps) or optical carrier (OC)-3 (155Mbps) connections. And while digital subscriber line (DSL) and coaxial cable television (CATV) technologies offer a more affordable interim solution for data, they are infirmed by their relatively limited bandwidth and reliability.

Yet even as access network improvements have remained at a relative bandwidth standstill, bandwidth has been increasing dramatically on long haul networks through the use of wavelength division multiplexing (WDM) and other technologies. Additionally, WDM technologies have penetrated metropolitan-area networks, thereby boosting their capacities dramatically. At the same time, enterprise local-area networks have moved from 10 Mbps to 100 Mbps, and soon many will utilize gigabit (1000 Mbps) Ethernet technologies. The end result is a gulf between the capacity of metro networks on one side, and end-user needs and networks on the other, with a last-mile "bottleneck" in between. Passive optical networks—and in particular Ethernet Passive Optical Networks—promise to break this last-mile bottleneck.

The economics of PONs are compelling. Optical fiber is the most effective medium for transporting data, video, and voice traffic, and it offers a virtual unlimited bandwidth. But the cost of deploying fiber in a "point-to-point" arrangement from every customer location to a CO, installing active components at each endpoint, and managing the fiber connections within the CO is prohibitive. PONs address these shortcomings of point-to-point fiber solutions by using a point-to-multipoint topology instead of point-to-point; eliminating active electronic components such as regenerators, amplifiers, and lasers from the outside plant; and by reducing the number of lasers needed at the CO.

Unlike point-to-point fiber-optic technology, which is typically optimized for metro and long haul applications, PONs are designed to address the demands of the access network. And because they are simpler, more efficient, and less costly than alternative access solutions, PONS finally make it cost effective for service providers to extend optical fiber into the last mile.

Accordingly, PONs are being widely recognized as the access technology of choice for next-generation, high speed, low cost access network architectures. PONs exhibit a shared, single fiber, point-to-multipoint passive optical topology while employing gigabit Ethernet protocol(s) to deliver up to 1 Gbps of packetized services that are well suited to carry voice, video and data traffic between a customer premises and a CO. Adding to its attractiveness, PONs have been recently ratified by the Institute of Electrical and Electronics Engineers (IEEE) Ethernet-in-the-First Mile (EFM) task force in the IEEE 802.3ah specification.

With reference to FIG. 1, there is shown a typical PON as part of overall network architecture 100. In particular, an EPON 110 is shown implemented as a "tree" topology between a service provider's CO 120 and customer premises 130[1] . . . 130[N], where a single trunk or "feeder" fiber 160 is split into a number of "distribution" fibers 170[1] . . . 170[N] through the effect of 1×N passive optical splitters/combiner 180.

As can be further observed with reference to this FIG. 1, the trunk fiber 160 is terminated at the CO 120 at Optical Line Terminator (OLT) device 190 and split into the number of distribution fibers 170[1] . . . 170[N] which are each either further split or terminated at an Optical Network Unit (ONU) 150[1] . . . 150[N] located at a respective customer premises 130[1] . . . 130[N].

Due to the directional properties of the optical splitter/combiner 180, the OLT 190 is able to broadcast data to all ONUs in the downstream direction. In the upstream direction, however, ONUs cannot communicate directly with one another. Instead, each ONU is able to send data only to the OLT. Thus, in the downstream direction a PON may be viewed as a point-to-multipoint network and in the upstream direction, a PON may be viewed as a multipoint-to-point network.

As can be readily appreciated, in a large passive optical network, there exist a very large number of PON OLT devices. Managing this plurality of devices is a job that has historically involved a tedious, manual provisioning of static configurations. As a result, configurations are oftentimes replete with errors that are not easy to detect.

SUMMARY OF THE INVENTION

In recognition of these needs and deficiencies in the Art, we have developed method(s) and apparatus for management and control of passive optical networks and devices in a distributed environment. Advantageously, the methods and apparatus employ a system-on-chip solution wherein a microprocessor and associated software are resident within each PON device.

In sharp contrast to earlier attempts to control and manage PONs, the invention of the instant application utilizes a novel method for managing and controlling PON devices in a distributed and dynamic manner.

Devices constructed according to the present invention exhibit a high degree of scalability along with high management performance. As a result of their multi-threaded, asynchronous methodology, the devices permit the management of multiple devices simultaneously without exhibiting system level blocking that plagued the prior art.

Still further, devices constructed according to the present invention utilize a built-in intelligence which permit the automatic discovery of devices that arrive into and depart from a network. As a result, hot swapping and high availability characterize devices constructed according to the present invention.

Further features and advantages of our invention will become apparent with reference to the accompanying drawing and illustrative detailed description.

DETAILED DESCRIPTION

The PON system-on-chip which is the subject of the present invention comprises three major components: an OLT device, an ONU device, and a software component, iROS. In a preferred embodiment, the OLT and ONU devices are Application-Specific Integrated Circuits (ASIC) devices having integrated microprocessors for control and management. The iROS software comprises a distributed operating system that provides the management and control of an EPON system constructed from OLT device and ONU device chipset (s).

Figure 1:
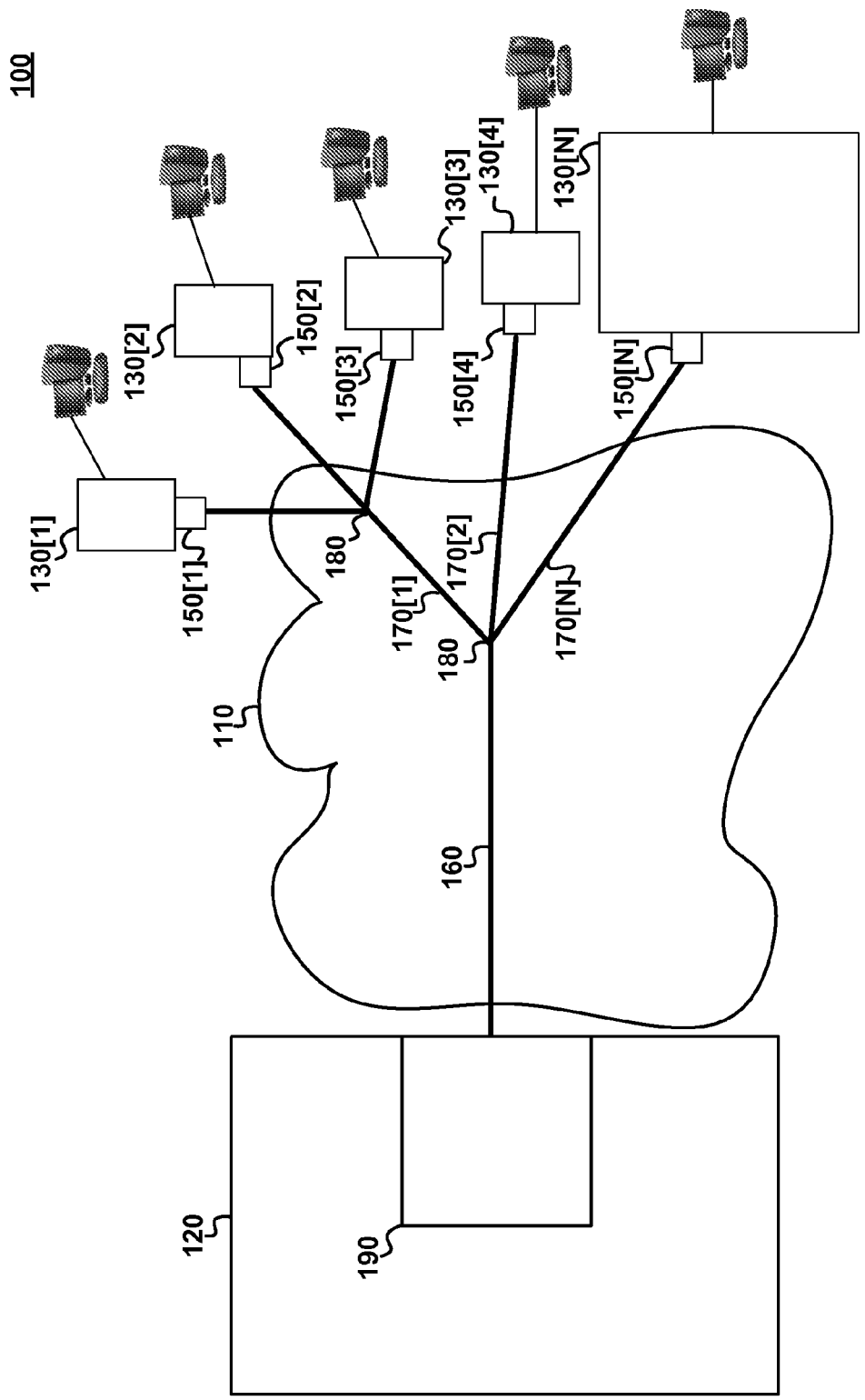
FIG. 1 is a block diagram of a representative Passive Optical Network showing both customer premises and central office aspects.
Figure 2:
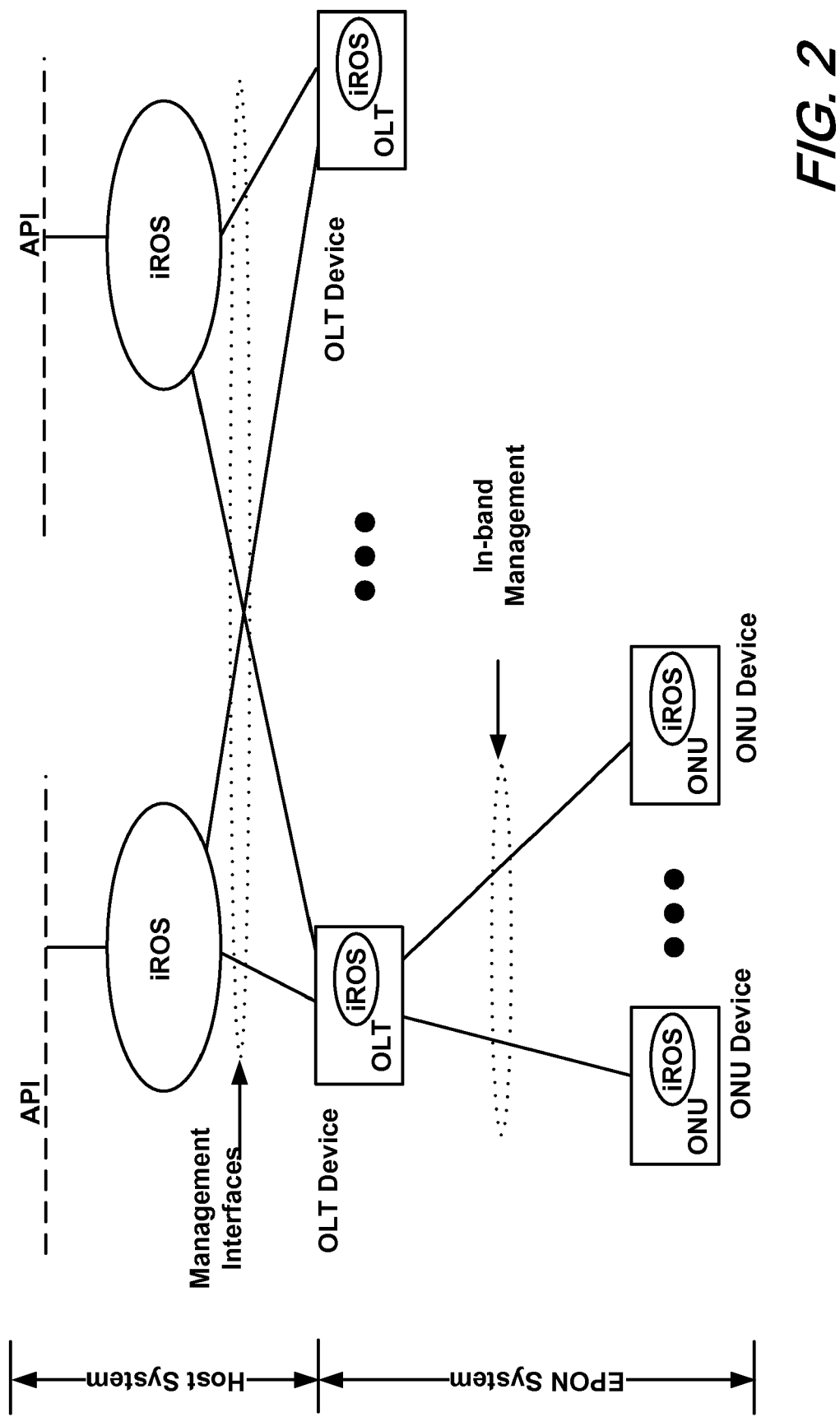
FIG. 2 is a schematic block diagram of an operating system (iROS) according to the present invention.

Turning now to FIG. 2, there are shown two domains of operation in which the iROS software operates, namely a host system domain and a PON system domain. The host system domain includes software systems residing in head-end systems that provide the PON services. As can be readily understood, for the purposes of this discussion, the PON system is an access network which is built using the OLT and ONU chipsets.

The iROS software is responsible for the management and control of the overall PON system and provides the application programming interface to a host system. In a preferred embodiment, the iROS software comprises three software components that work in concert to provide the management and control functions. As presently constituted the software components comprising the iROS software includes:

iROS-SC: is a software component which runs in a host system and is the central point of operation for the distributed system. It communicates with the other two software components and provides the application programming interface to the PON applications resident in the host system.

iROS-OLT: is a software component which runs on an microprocessor integrated within the OLT device, and serves as a gateway to remote ONU devices. The integrated, built-in microprocessor provides a support/execution environment for iROS-OLT. In addition to controlling the OLT device, iROS-OLT communicates directly with the iROS-SC component and the iROS-ONU component. In a preferred embodiment, one instance of iROS-SC will manage multiple instances of iROS-OLT. The communication between iROS-SC and iROS-OLT preferably occurs via one or more Ethernet management interfaces. As can be appreciated by those skilled in the art, such communication is generally known as an out-band management channel.

iROS-ONU: is a software component which runs on the microprocessor built-in the ONU device, and is physically positioned at a remote end of an iROS distributed system. As with the OLT device, the microprocessor built-into ONU devices provide a support and execution environment while controlling the operation of the ONU device. Typically, one instance of iROS-OLT will manage multiple instances of iROS-ONU. Communication between iROS-OLT and iROS-ONU occurs via the PON, in-band management channel.

Advantageously, and according to the present invention, the iROS software is fault tolerant when made part of the host system. Consequently, there may be at least two instances of iROS-SC running in the host system. In a representative implementation, each iROS-SC instance runs on a separate controller card in the host system. In such an implementation, a single, running iROS-SC instance could fail—caused by any of a variety of events, e.g., controller card failure—while other instances would remain operational. As a result, such a system would operate correctly so long as at least one controller card remained operational.

As noted, communication between the iROS-SC and an iROS-OLT may be conducted through the internal management infrastructure in the host system. Oftentimes, such an internal management infrastructure comprises a switched Ethernet environment. For this purpose, in a preferred embodiment, each OLT device is advantageously equipped with at least two management, i.e., Ethernet interfaces. As a result, an individual instance of iROS-OLT may interact with two iROS-SC instances simultaneously.

The communications between an iROS-OLT instance and an iROS-ONU is preferably in-band, through Ethernet OAM frames and/or vendor specific control frames. Under certain situations, e.g., an ONU software upgrade, iROS-SC may need to exchange Ethernet frames directly with the ONU. In these cases, iROS-OLT serves as an internal gateway that forwards received frames to a desired destination within the iROS operating environment.

In a preferred embodiment, the internal control frame between iROS components is built on a layer 3 structure. As a result, when the control frame is received from an iROS-SC, an iROS-OLT may simply forward the control frame, rather than terminating it, if it is destined for a remote iROS-ONU. As can be readily appreciated by those skilled in the art, this characteristic results from the control frame containing the destination information in the layer 3 structure. Such a structure further enhances overall system performance.

System Identification

Figure 3:
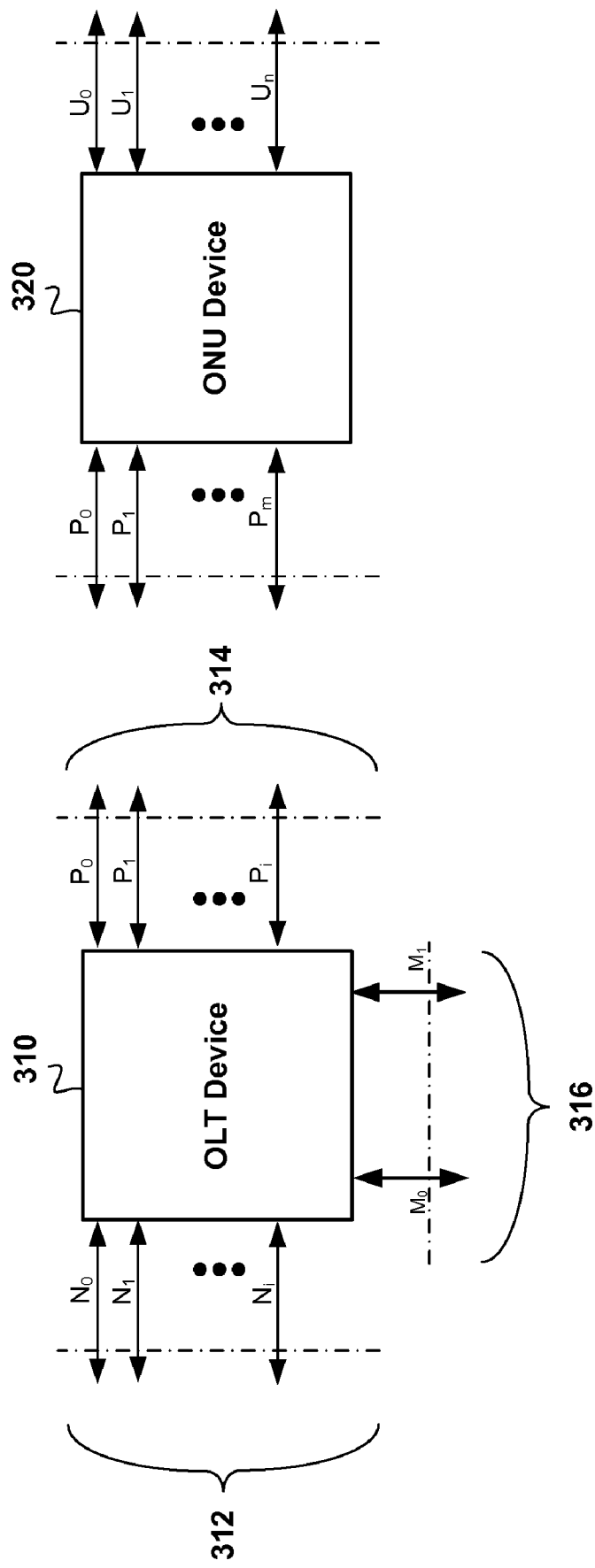
FIG. 3 is a schematic block diagram of a system identification module according to the present invention.

One underlying objective of the design of the iROS software is the ability to scale as new generations of OLT and ONU devices become available. As a result, the iROS software system which is the subject of the instant application employs a generic system identification scheme as illustrated in FIG. 3. With reference to that FIG. 3, there is shown two types of PON hardware devices, namely an OLT device 310 and an ONU device 320. As can be observed, an OLT device according to the present invention includes three types of interfaces, namely a Network-Node Interface 312 (NNI), a Passive Optical Network Interface 314 (PON) and a Management Interface 316.

The Network-Node Interface 312 represents any uplinks toward the host system. As shown, it may include a plurality of Network-Node Interface (NNI) ports which are denoted in this FIG. 3 as $N_0, N_1, \ldots, N_j$. In a preferred embodiment, an NNI interface may support a number of interfaces, for example, 1 Gbps Ethernet or 10 Gbps Ethernet.

The PON interface 314 comprises a number of PON ports which, in FIG. 3 are denoted as $P_0, P_1, \ldots, P_j$. Finally, a Management interface is provided and shown in the FIG. 3 as providing two separate management ports, namely $M_0$ and $M_1$. Advantageously, by providing more than one management port, a PON system constructed from such an OLT device may overcome a failure in one of the management ports and failover to the backup port(s) as required.

With continued reference to FIG. 3, it is shown that a representative ONU device 320 includes a number of interfaces including both a PON interface and a User-Network Interface. The PON interface comprises a number of distinct ONU PON ports, denoted in this FIG. 3 as P0, P1, . . . , Pm. Similarly, the User-Network Interface comprises a number of individual ports, and are used to provide downlinks towards an end user of the PON. In this FIG. 3, the UNI ports are designated as U0, U1, . . . , Un. As implemented, each ONU PON port is connected to a distinct OLT PON port in the same or different OLT device(s). For a given PON port, however, it may advantageously support more than one LLID (Logical Link Identifier).

As can be readily appreciated by those skilled in the art, since the present invention supports more than one PON port, it may advantageously provide redundant communication paths thereby providing fall-back or fail safe operation during communication failure. Such capability is preferably provided via Automatic Protection Switching (APS)—which is generally the capability of communications system (in this case, an EPON system) to detect a failure on a working facility and to switch to a standby facility to recover the traffic. As can be appreciated, such a capability has a profoundly positive effect on the overall system availability.

Figure 4:
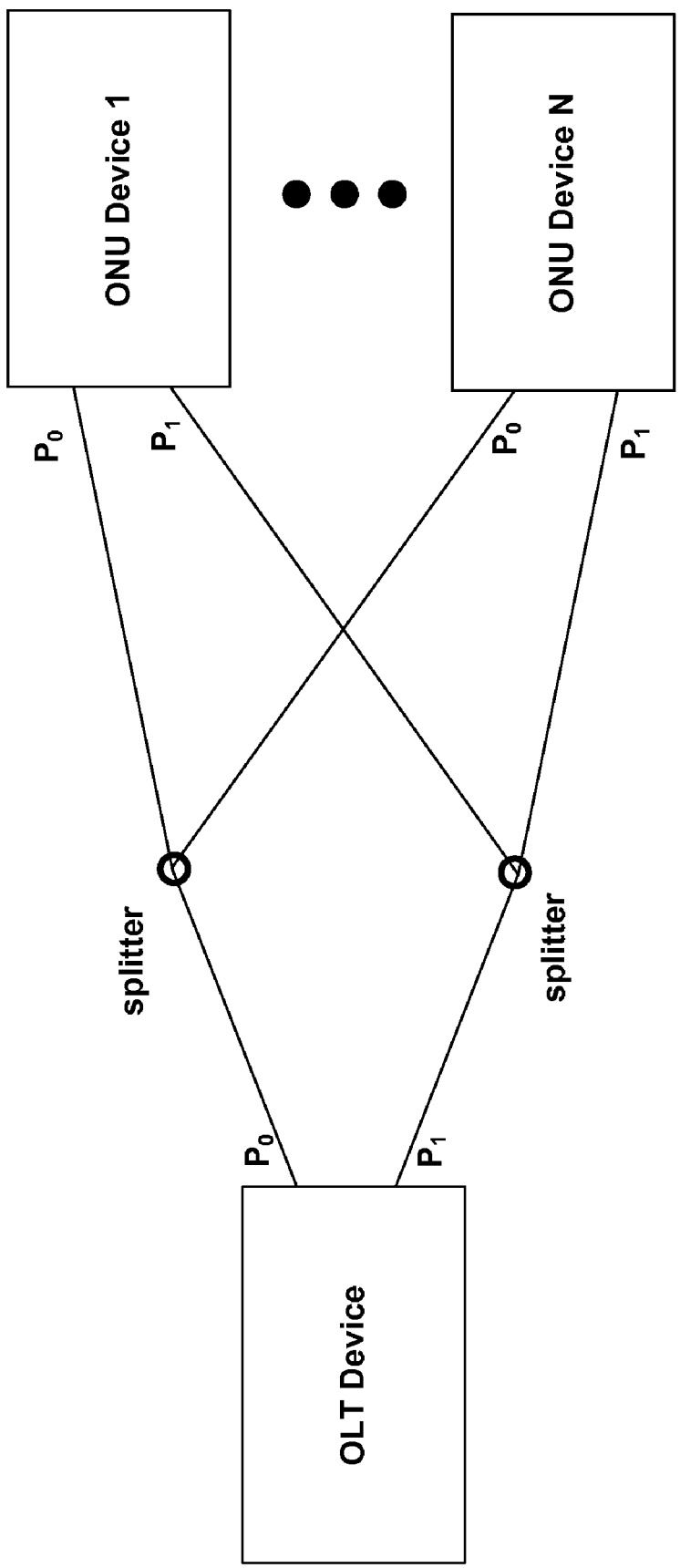
FIG. 4 is a schematic block diagram depicting a facility protection configuration according to the present invention.

As an example, and with initial reference to FIG. 4, there are shown two ODN networks having one OLT device and N ONU devices. Each ODN has a fiber tree connecting ONU devices via an optical splitter. Each ONU device is connected to both ODN networks.

In the configuration as shown, each ONU and OLT device has two PON ports, respectively. A single PON port participates in one ODN operation. To survive a failure, i.e., a fiber failure, each device shown in FIG. 4 is provided with both active and standby PON ports which are denoted as 0 and 1, respectively. Accordingly, in the event of a fiber cut or other facility failure, working traffic is switched to the standby PON port.

Figure 5:
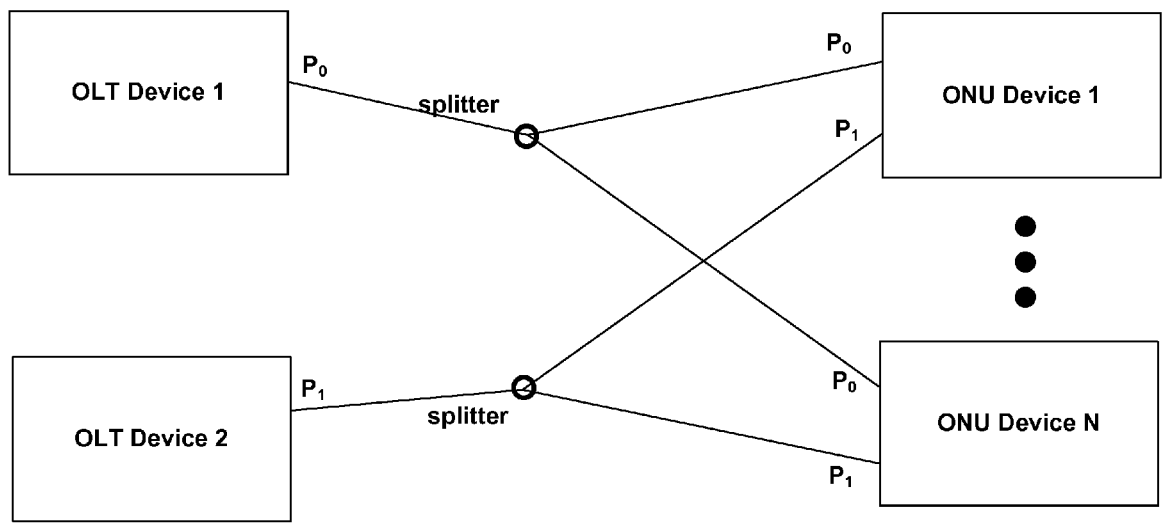
FIG. 5 is a schematic block diagram depicting equipment and facility protection according to the present invention.

In a preferred embodiment, there are two separate communication paths from an individual OLT device to an individual ONU. Advantageously, these separate paths may be used to exchange protection switching information. To further provide facility protection against an OLT device failure, according to the present invention an EPON system may be configured as shown in FIG. 5. As shown in that FIG. 5, there are two OLT devices. In the event that one OLT device fails, there is still a working path from the protection OLT to every ONU device.

From the perspective of system management and control, there are three levels of control and management in a PON system namely, device level, PON port level, and LLID level. At the device level, for example, it is important to be able to reset the device, or perform a remote software upgrade. Examples of control and management at the PON port level may include optical parameters configurations and status information retrieval. Many operations of control and management are performed at the LLID level.

Asynchronous Application Programming Interface

Returning now to FIG. 2, the iROS application programming interface as show in that FIG. 2 provides an abstraction of underlying management and control capability. Accordingly, a host system and its associated PON applications will manage and control an PON via the iROS API interface. Advantageously, this model—according to the present invention—allows the system to evolve transparently as changes occur in an internal PON system.

Figure 6:
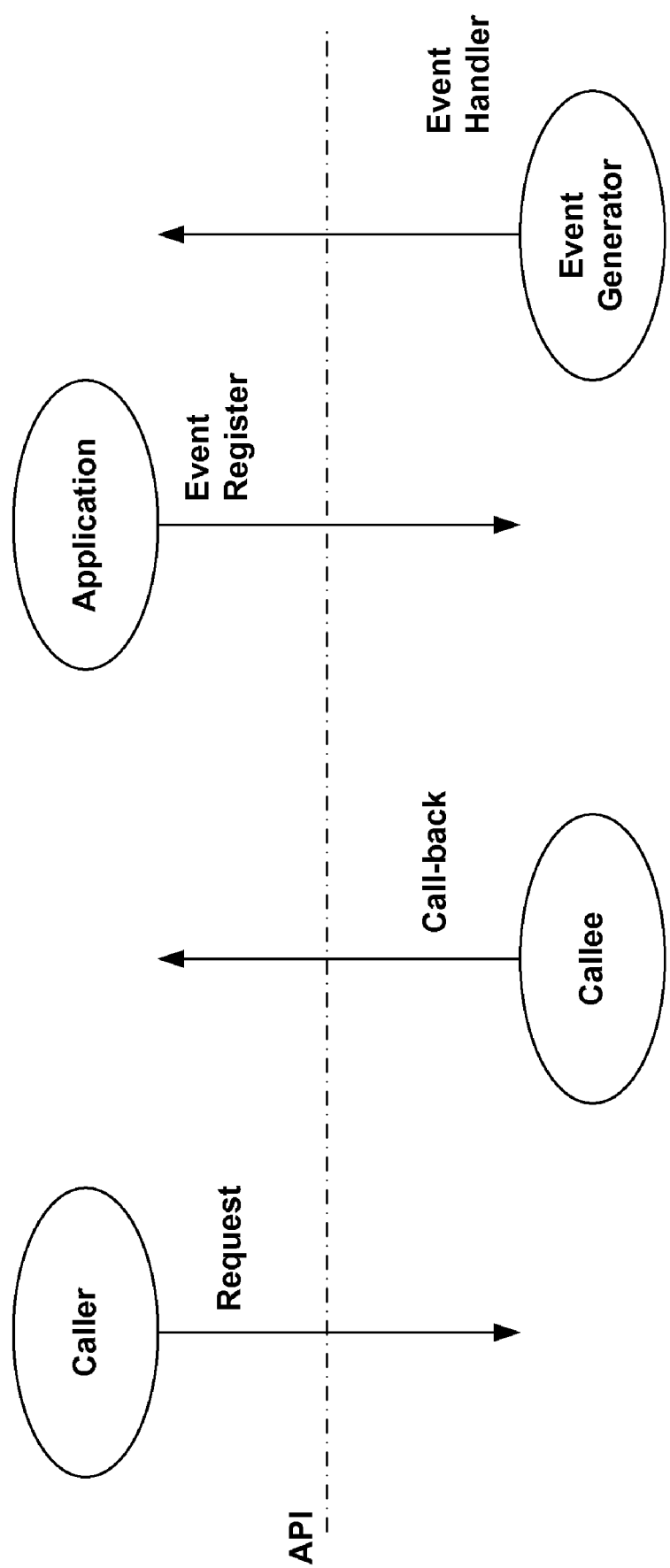
FIG. 6 is a block diagram depicting an applications programming interface (API) for an operating system (iROS) according to the present invention.

The function invocation model employed by the iROS API is based on asynchronous callbacks, where there is a single callback for each function call. Accordingly, completion of work associated with an API function call is not indicated by the return of the call, but by the invocation of a separate completion callback function from the callee to the caller. Of particular advantage, the present invention allows substantially more flexibility than alternatives in that a caller is not blocked waiting for the result. Consequently, a greater degree of parallelism is achieved while still allowing synchronous behavior to be easily layered on top of the asynchronous callbacks if desired. Such an operational context is depicted in FIG. 6. The request is executed in the caller's context. The call-back is performed in the callee's context.

Additionally, and according to the present invention, the iROS API is advantageously able to handle asynchronous events. Since all events are predefined, each application which is interested in an event is required to register itself via the iROS API. The registration contains an event handler, which is in turn executed by iROS when the event takes place. The event handler is somewhat similar to the call-back function discussed earlier.

Turning our attention now to FIG. 6, there it is shown the components comprising the iROS API. As shown, the iSOS API comprises:

1. Request: An application invokes a request function within its own context for a certain task. An asynchronous model is adopted for all request functions except for some special purpose ones like initialization. An asynchronous request function invocation means that it will return without waiting for task completion. However, the application could be informed of task completion status via the execution of a call-back function, which is performed within the context of iSOS.

2. Call-back: A call-back function is supplied by the application that invokes the request function. The call-back execution is reliable, meaning that iSOS uses certain mechanisms to prevent call-back loss or duplication. The application may receive a call-back as the result of request time-out, without knowing whether the request has been satisfied or not. iSOS only supplies type definitions of call-back functions.

3. Event: It is an asynchronous mechanism for iSOS to notify applications of spontaneous activities like alarms. iSOS will define the types of events it will generate while applications need to register event handlers for those they are interested in. When an event happens, it will be delivered to the application through the event handler. A synchronous event delivery model is adopted, implicating that the return of the event handler function indicates the end of delivery.

Dynamic Discovery

Figure 7:
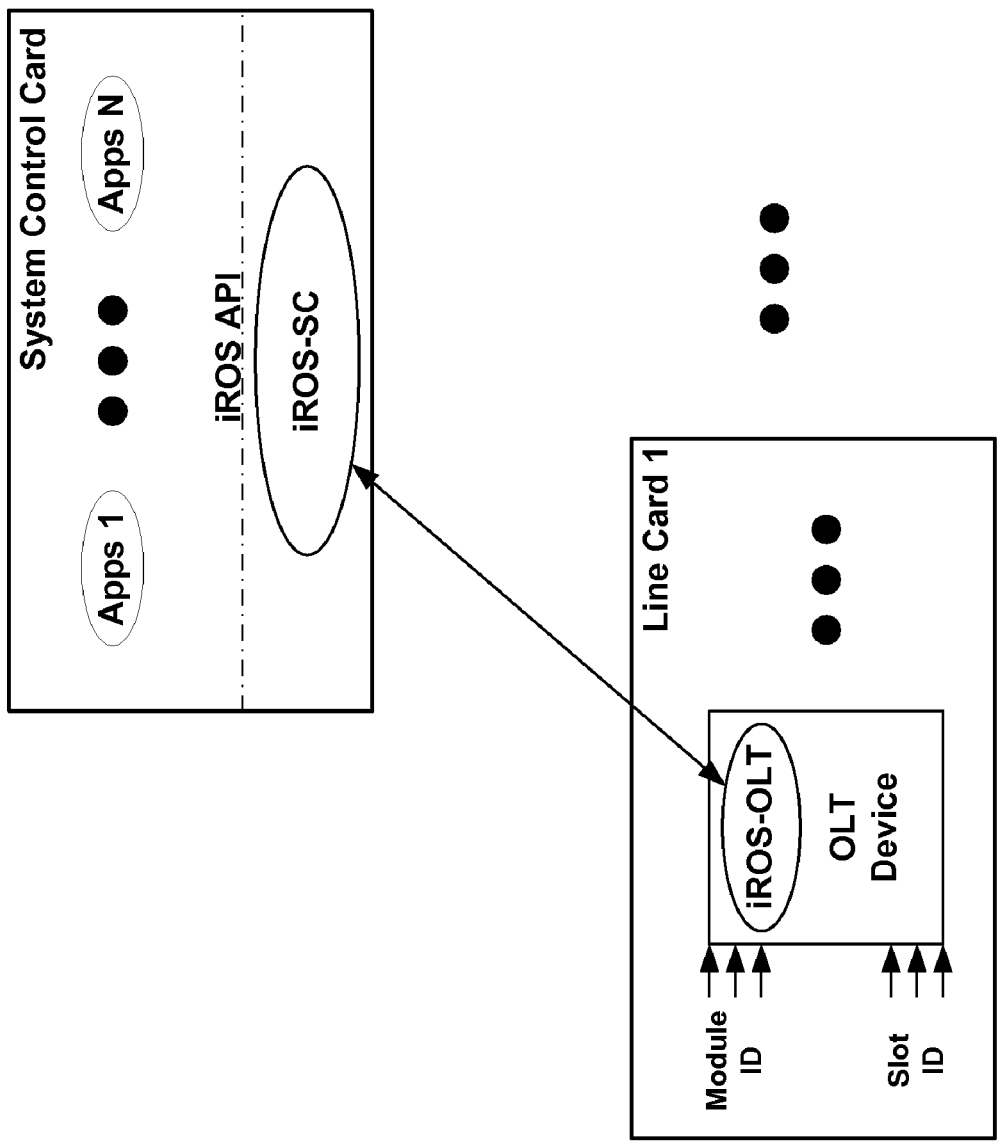
FIG. 7 is a block diagram depicting a chassis configuration of a system according to the present invention.

According to the present invention, the iROS software is designed to support a chassis based host system having hot swap capabilities and high availability characteristics. As implemented in a preferred embodiment, it is a plug and play technology that supports the dynamic registration of both OLT devices and ONU devices. A typical chassis based system constructed according to the present invention is illustrated in FIG. 7, where the one shown has one system control card and multiple line cards.

As noted earlier, the iROS-SC software component integrated with the host system may advantageously be located in the system control card. Each line card may include one or more OLT device. Preferably, each individual OLT device includes both a module identifier and a line card slot identifier. The module identifier identifies the relative position of the OLT in the line card when there is more than one such device in the same line card. The line card slot identifier uniquely identifies the physical position of the line card in a chassis based system.

As a result of these identifiers, the above information may be obtained when the OLT device is inserted or otherwise enters into the system (e.g., a line card insertion in the host system takes place.). Such characteristics greatly assist, for example, with system troubleshooting and hardware replacement. As can be appreciated, any event that is generated by an OLT device will include the above information so that the host system can immediately identify the source of the event. Consequently, an individual OLT device in the system—according to the present invention—is identified by a tuple <slot id, OLT module id>.

The ability to dynamically detect the arrival and departure of an OLT device to/from a large chassis system is of critical importance. Advantageously—and according to the present invention—such detection is performed via a "Hello" protocol.

In order to support the dynamic discovery, iROS-SC employs a well-known multicast Ethernet address, which allows any newly arrived OLT device to communicate. Accordingly, at all times iROS-SC listens for communications utilizing this multicast address. When a line card enters the system, the OLT device will first read the information describing its module ID and slot ID which is reported to iROS-SC during the initial communication.

Operationally, the first task for an entering iROS-OLT unit is to send a HELLO message to the known multicast Ethernet address, announcing its arrival. This HELLO message is repeated at a prescribed time interval until it receives a response from an iROS-SC instance in the system. The HELLO message includes the module ID and slot ID information, and once an iROS-SC receives this HELLO message, it will echo back to the sending iSOS-OLT. Once connected, the iROS-OLT will continue to send a HELLO message to the connected iROS-SC, at periodic intervals.

In addition, the iROS-SC periodically sends a HELLO message using another well-known multicast address to advertise its capability. This multicast HELLO message is received by all iROS-OLTs in the system. Once an iROS-OLT receives the HELLO message from the iROS-SC, it too will echo back to the iROS-SC. This back-and-forth process advantageously allows the establishment of bi-directional peering between an iROS-SC and any iROS-OLT.

This HELLO protocol also provides a "keep-alive" mechanism between an iROS-OLT and iROS-SC since the iROS-SC and iROS-OLT periodically exchanges the HELLO messages. As can be readily appreciated, an iROS-SC would detect the departure of an OLT device, if that device does not respond to a transmitted HELLO message within a predetermined time interval.

In order to implement such a protocol, there are two HELLO parameters which must be agreed upon by both the local and remote entities namely, HelloInterval and HelloDeadInterval. In a preferred embodiment, these parameters are exchanged in the initial HELLO message.

The HelloInterval parameter indicates how frequently HELLO messages will be sent, in milliseconds (ms). For example, if the value were 150, then the transmitting entity would send a HELLO message at least every 150 ms.

The HelloDeadInterval indicates how long (in milliseconds ms) a device should wait to receive a HELLO message before declaring the connection dead. As can be readily appreciated, the HelloDeadInterval value must be greater than the HelloInterval value, and in a preferred embodiment is at least 3 times the value of HelloInterval.

In a large chassis system it is of critical importance to dynamically detect the arrival and departure of an ONU device. According to the present invention, a first approach employs the known, multipoint control protocol (MPCP) timeout. According to this protocol, if an OLT device does not receive a regular report message from an ONU within a specified time interval, the OLT device will declare the "silent departure" of the ONU device. This silent departure detection mechanism takes place in the data path.

Another approach to detect the arrival and departure of an ONU device to/from the system—according to the present invention—employs the known OAM control protocol running between an iROS-OLT and an iROS-ONU. This protocol advantageously allows the establishment of a "peering" relationship between the iROS-OLT and the iROS-ONU. After the peering relationship has been established, the iROS-OLT periodically exchanges information messages with the iROS-ONU. If the iROS-OLT fails to receives a response message within a specified time interval, the iROS-OLT will declare the loss of the iROS-ONU entity.

In a preferred embodiment the time interval necessary for a peer timeout is typically one second and advantageously this method of detection employs the control path to effect the communication. And while it takes a somewhat longer time in comparison with the data path detection described previously (450 ms vs. 1 second); however, it is capable of detecting the problems above the MAC layer such as software errors.

High Availability

Figure 8:
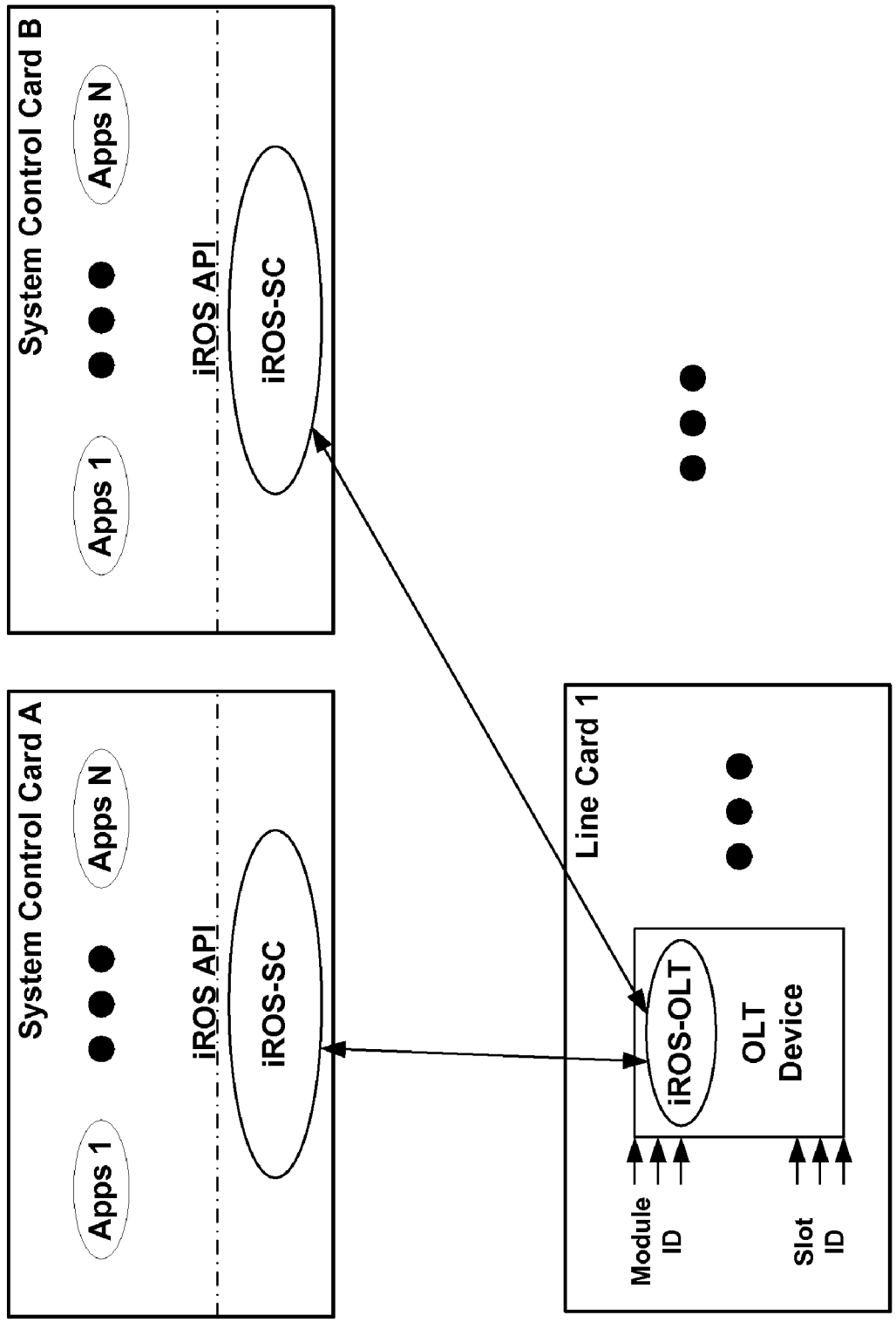
FIG. 8 is a block diagram depicting a high-availability chassies configuration of a system according to the present invention.

Those skilled in the art will readily appreciate that high availability is of critical importance with network infrastructure components/systems. According to the present invention, one aspect of high availability is realized as a result of two instances of iROS-SC running on different system control cards as shown in FIG. 8. The role of one instance is active while the other is standby. The role of each instance is configured by the host system upon initialization. If there is a single system control card in the system, then there will be only one iROS-SC instance in the system. When a new system control card is added into the system, during initialization, the iROS-SC instance running on the newly added system control card will be configured to the role of standby.

When employed with the dynamic discovery method described earlier, and since a HELLO message sent from an iROS-OLT uses a multicast address, it will be received by two instances of iROS-SC if they both are present in the host system. According to the present invention, however, only the active iROS-SC will establish the peering relation with the iROS-OLT.

As can now be appreciated by those skilled in the art, the transition from standby to active role of an iROS-SC instance—either in a controlled or uncontrolled manner—is a "switchover". One example of a controlled switchover is the graceful shut down of an active system control card for maintenance purpose. An example of an uncontrolled switchover, is a "crash" or other uncontrolled shutdown of an active system control card.

Of course, one objective of a high reliability, carrier class system which is the subject of the present invention is to provide non-disruptive service and maintain an operational system in the event of iROS-SC switchover. For instance, it is critical that OLT and ONU devices will not require re-registering again with the system, when the switchover is taking place. This requirement is known as the non-stop forwarding, meaning that the PON system will continue to forward data traffic without interruption.

There are a number of approaches which may be employed to provide a carrier class, high availability design according to the present invention. A first approach utilizes intelligent and stateful iROS-SC implementations, while any iROS-OLT implementations remain stateless. With this approach, two iROS-SC instances remain synchronized all the time with respect to the state information such as the number of current registered OLTs and ONUs. In such a case a switchover is advantageously transparent to any iROS-OLT instance in the system.

An alternative approach—according to the present invention—utilizes intelligent and stateful instances of iROS-OLT, while any iROS-SC instances remain stateless. With this approach, iROS-OLT maintains the state information while iROS-SC does not.

In the event of a switchover from an active to standby iROS-SC instance, the newly active iROS-SC will retrieve the state information from all currently registered iROS-OLTs. One benefit of this approach is that it will work in a situation where there is only one iROS-SC instance in the system. While such a situation is not normal—according to the present invention—those skilled in the art will appreciate that an iSOS-SC instance can temporarily be down, for example, during a power cycle and then return to operation after a short period of time. This approach requires that an iROS-OLT instance maintain any necessary state information.

What is claimed is:

1. A highly reliable, carrier-class passive optical network system (PON) comprising:
   a host system including at least two instances of operating software (iROS-SC) wherein only one of the instances is active at a given time and the remaining instances are in a standby mode;
   one or more optical line terminator (OLT) devices, said OLT devices including an instance of operating software (iROS-OLT) wherein said iROS-OLT is in communication with iROS-SC via a management channel; and
   a plurality of optical network units (ONUs), connected to said OLT by a passive optical network, said ONUs including an instance of operating software (iROS-ONU) in communication with an instance of iROS-OLT via the passive optical network.

2. The passive optical network system of claim 1 wherein said host system includes a means for promoting an instance of the operating software from standby mode to active mode.

3. The passive optical network system of claim 1 wherein each of said OLT devices includes more than one management channel, wherein only one of the multiple management channels is active at a given time and the remaining ones are in a standby mode.

4. The passive optical network of claim 1 wherein each of said OLT devices includes a means for selecting one of the management channels to be the active channel.

5. The passive optical network of claim 1 wherein said host system includes a means for automatically adding additional OLT devices to the system while automatically configuring the added OLT devices.

6. The passive optical network of claim 1 wherein said host system includes a means for removing OLT devices from the system without disrupting system operation.

7. The passive optical network of claim 1 wherein said host system includes a means for determining whether an OLT device has been added to the system or removed from the system.

8. The passive optical network of claim 7 wherein said determining means includes a means for determining a specific slot and module identification of the OLT device.

9. The passive optical network of claim 1 wherein each of said OLT devices is identified by a unique identifier, said unique identifier including an OLT module ID and an OLT slot ID which are both specific to the particular OLT device.

10. The passive optical network of claim 7 wherein said determining means includes a means for determining a specific version of the added OLT device.

11. The passive optical network of claim 10 wherein said version determining means includes a means for downloading version-specific operating software to the added OLT device.

12. The passive optical network of claim 7 wherein said OLT device addition determining means employs a multicast discovery protocol to detect the addition of an OLT device from the passive optical network.

13. The passive optical network of claim 12 wherein said OLT device removal determining means employs a point-to-multipoint keep-alive protocol to detect the removal of an OLT device from the passive optical network.

14. The method of operating a passive optical network of claim 13 further comprising the steps of:
   determining whether an additional OLT has been added to the passive optical network; and
   configure automatically any additional OLT's so determined to be added.

15. In a highly reliable, carrier-class passive optical network system (PON) comprising a host system including at least two instances of operating software (iROS-SC) wherein only one of the instances is active at a given time and the remaining instances are in a standby mode; one or more optical line terminator (OLT) devices, said OLT devices including an instance of operating software (iROS-OLT) wherein said iROS-OLT is in communication with iROS-SC via a management channel; and a plurality of optical network units (ONUs), connected to said OLT by a passive optical network, said ONUs including an instance of operating software (iROS-ONU) in communication with an instance of iROS-OLT via the passive optical network, a method of operating said passive optical network, said method comprising the steps of:

determining whether the active instance of operating software iROS-SC is functioning correctly; and promoting a remaining instance of iROS-SC to active mode as a result of said correctly-functioning determination.

16. The method of operating a passive optical network of claim 15 wherein said automatic configure step comprises the steps of:

determining both slot and module identifiers associated with the added OLT;

determining a version and set of capabilities associated with the added OLT; and downloading an appropriate version of operating software to the added OLT.

17. The method of operating a passive optical network of claim 16 wherein said step of determining whether an additional OLT has been added to the passive optical network comprises the steps of:

broadcasting, via a multicast discovery, a HELLO protocol whereby an added OLT announces its arrival.

18. The method of operating a passive optical network of claim 17 wherein said step of determining whether an additional OLT has been removed from the passive optical network comprises the steps of:

transmitting, via a point-to-multipoint mechanism, the HELLO protocol whereby a removed OLT fails to respond in a pre-determined interval.

19. The method of operating a passive optical network of claim 18 wherein said HELLO transmissions are made at a specified interval and the predetermined interval for response is at least three times the length of the specified interval.

\* \* \* \* \*

UNITED STATES PATENT AND TRADEMARK OFFICE
CERTIFICATE OF CORRECTION

PATENT NO. : 7,606,489 B2  Page 1 of 1
APPLICATION NO. : 11/420467
DATED : October 20, 2009
INVENTOR(S) : Charles Chen et al.

It is certified that error appears in the above-identified patent and that said Letters Patent is hereby corrected as shown below:

Title page, Item (73), under Assignee section:

delete "Systes," and insert therefor --Systems,--

Signed and Sealed this

Sixteenth Day of February, 2010

David J. Kappos
*Director of the United States Patent and Trademark Office*